No. 718,445. PATENTED JAN. 13, 1903.
W. H. FLIEHMANN.
ADJUSTING HEAD FOR TRIPODS.
APPLICATION FILED APR. 24, 1902.
NO MODEL.
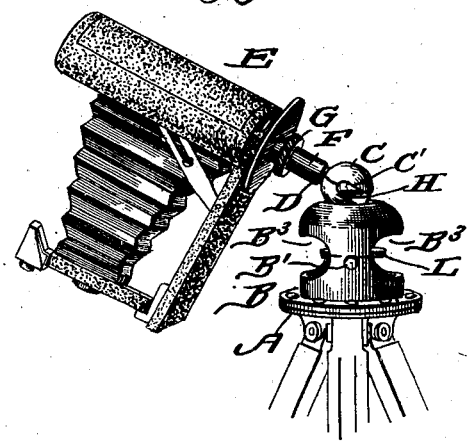
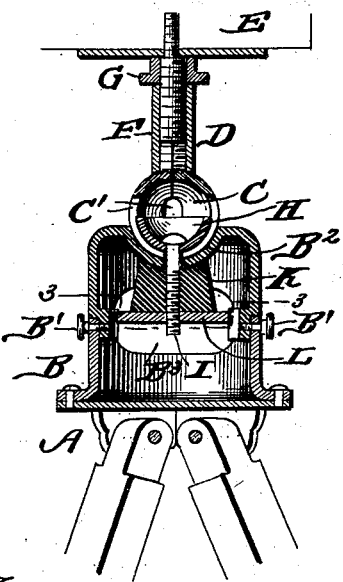
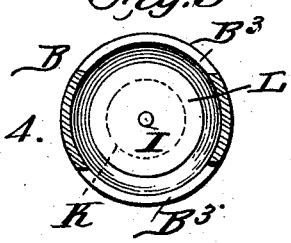
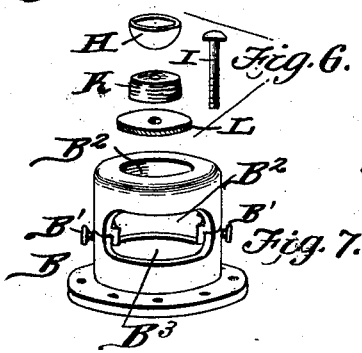
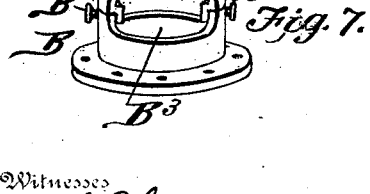
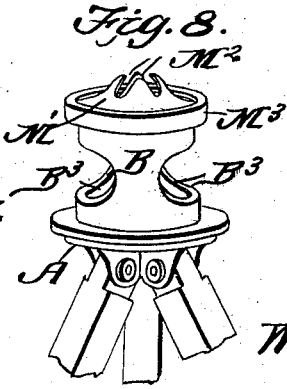
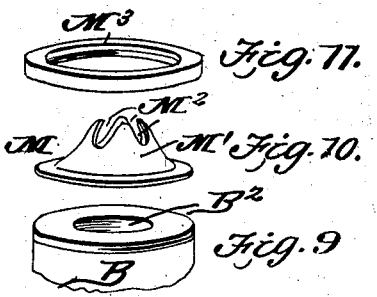
Witnesses
Inventor
W. H. Fliehmann.
Attorneys
THE NORRIS PETERS CO., PHOTO-LITHO., WASHINGTON, D. C.

UNITED STATES PATENT OFFICE.

WILLIAM H. FLIEHMANN, OF MOBERLY, MISSOURI.

ADJUSTING-HEAD FOR TRIPODS.

SPECIFICATION forming part of Letters Patent No. 718,445, dated January 13, 1903.

Application filed April 24, 1902. Serial No. 104,500. (No model.)

*To all whom it may concern:*

Be it known that I, WILLIAM H. FLIEHMANN, a citizen of the United States, residing at Moberly, in the county of Randolph and State of Missouri, have invented a new and useful Adjusting-Head for Tripods, of which the following is a specification.

This invention is an adjustable-head connection for tripods for connecting a camera to the tripod; and the object of the invention is to provide a very simple connection by means of which the camera can be quickly and easily adjusted either horizontally or vertically to any position desired, so that objects directly above or below the camera can be brought into view, if so desired.

Another object is to provide a connection of such construction that it can be easily detached from the camera and tripod when desired and conveniently carried in the pocket; and a still further object is to provide a connection embodying these general features which shall be capable of various modifications as necessity and convenience may require.

With these objects in view my invention consists, essentially, in the employment of a base attached to the tripod and having a dished or concavo-convex top, a shank adapted to be attached to the camera and terminating in an essentially spherical head adapted to rest in the dished or concavo-convex top of the base, and means for securing the head to the base in any adjusted position.

In the drawings forming a part of this specification, Figure 1 is a perspective view showing the practical application of my invention, the camera being adjusted for photographing an object almost directly beneath the tripod. Fig. 2 is a vertical sectional view illustrating the various parts of my invention. Fig. 3 is a section taken on the line 3 3 of Fig. 2. Fig. 4 is a detail perspective view, partly in section, and illustrating the shank adapted to be connected to the camera. Fig. 5 is a bottom view more clearly showing the spherical head and the end of the shank. Fig. 6 is a view illustrating the hemispherical cap, bolt, washer, and milled nut by means of which the shank is connected to the base. Fig. 7 is a detail perspective view of the said base. Fig. 8 shows a slightly-modified form of connection, and Figs. 9, 10, and 11 show the details of such modification.

Referring to the drawings, A indicates the top of the tripod, to which the base B of my attachment is connected, said base being preferably constructed of an upper and lower section united by a shoulder-joint and connected by means of a set-screw B'. The upper end of the base is made dished or concavo-convexed, as shown at $B^2$, such concavity being nearly equal to a hemisphere, and located in said concavity is the essential spherical-shaped head C, which is arranged at the lower end of the shank D, which screws into the bottom of the camera E, said shank working in a sleeve F, which serves the purpose of connecting the sections of the head together and also forms a bearing for the jam-nut G, said jam-nut working upon the shank D just below its reduced end and serving to bind the shank and camera tightly together. The lower portion of the head C is slotted, as shown at C', said slots intersecting each other at the bottom at right angles, as most clearly shown in Fig. 5.

A hemispherical-shaped cap H is fitted in the spherical-shaped head, said cap being held in place by means of the bolt I, which passes down through the said cap, through the washer K, and is secured by means of a milled nut L, the base being provided with openings $B^3$ to permit the manipulation of this milled nut, so that by turning the nut in either direction desired the connection between the head and cap can be tightened or loosened, as desired, for the purpose of adjusting or fastening the camera, it being understood that the shank is first securely connected to the camera, and the camera can then be adjusted vertically or horizontally to the desired point, the slots in the head permitting the head to turn freely in the concavity of the base, the slot accommodating the bolt, which of course always remains vertical.

After the head has been adjusted to the desired point the milled nut is turned so as to securely bind the cap within the head, and thereby hold said head in a thoroughly rigid manner.

In Fig. 8 I have shown a slightly-modified form of base, in which the top instead of being made concavo-convex is provided with a supplemental plate M, which is pressed upwardly substantially in the form of a cone, as indicated at M', and provided with radial slots M², said plate M being held in place upon the top of the base by means of the collar M³.

In operation the spherical head is arranged within the conical portion of the plate and the radial slots accommodate the shank in the various adjustments of the camera.

It will thus be seen that I provide an exceedingly cheap and simple construction of head or connection for tripods, by means of which the camera can be quickly and easily adjusted to any desired position and one in which there is no limit to the adjustment either vertically or horizontally.

Having thus fully described my invention, what I claim as new, and desire to secure by Letters Patent of the United States, is—

1. The combination with a base, having a dished or concavo-convexed top, of a shank adapted to be attached to the camera and terminating in an essentially spherical head, the lower portion of said head being slotted, an essentially hemispherical cap arranged within the head, a bolt passing through said cap, head and top of the base, and the nut and washer secured upon the lower end of said bolt for the purpose specified.

2. In a device of the kind described, the combination with the head essentially spherical in shape and formed of two sections, the sleeve uniting the said sections and the shank projecting from said sleeve, substantially as specified.

3. The combination with the base, composed of an upper and lower section, the upper section having a dished top, a vertically-shaped head composed of two sections, said head being slotted, the hemispherically-shaped cap arranged within the head, a sleeve for uniting the sections of the head, a shank projecting through said sleeve and adapted to screw into the bottom of the camera, a bolt passing through the cap, the head, and the top of the base, and the nut and washer secured upon the said bolt, substantially as and for the purpose described.

WILLIAM H. FLIEHMANN.

Witnesses:
CHARLES LIEDL,
ED. B. MCCANNE.